(12) United States Patent
Sun et al.

(10) Patent No.: US 12,373,583 B2
(45) Date of Patent: *Jul. 29, 2025

(54) OPEN SOURCE LIBRARY SECURITY RATING

(71) Applicant: SAP SE, Walldorf (DE)

(72) Inventors: Xun Sun, Shanghai (CN); Huaiyu Yan, Nanjing (CN); Chuyunxiao Zhong, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,458

(22) Filed: Jun. 18, 2024

(65) Prior Publication Data
US 2024/0338463 A1 Oct. 10, 2024

Related U.S. Application Data

(63) Continuation of application No. 18/205,911, filed on Jun. 5, 2023, now Pat. No. 12,039,060, which is a continuation of application No. 17/364,112, filed on Jun. 30, 2021, now Pat. No. 11,709,949, which is a
(Continued)

(51) Int. Cl.
G06F 21/60 (2013.01)
G06F 8/65 (2018.01)
G06F 8/77 (2018.01)
G06F 21/51 (2013.01)

(52) U.S. Cl.
CPC .............. G06F 21/604 (2013.01); G06F 8/65 (2013.01); G06F 8/77 (2013.01); G06F 21/51 (2013.01); G06F 2221/033 (2013.01); G06F 2221/2101 (2013.01)

(58) Field of Classification Search
CPC .......... G06F 21/604; G06F 21/51; G06F 8/65; G06F 8/77; G06F 2221/033; G06F 2221/2101
See application file for complete search history.

(56) References Cited

U.S. PATENT DOCUMENTS 9,135,591 B1 * 9/2015 Nicol ..................... G06Q 10/06
10,235,527 B1   3/2019 Dalessio et al.
10,579,803 B1   3/2020 Mueller et al.
(Continued)

OTHER PUBLICATIONS

"U.S. Appl. No. 16/403,803, Notice of Allowance mailed Apr. 28, 2021", 9 pgs.
(Continued)

Primary Examiner — Vance M Little
(74) Attorney, Agent, or Firm — SCHWEGMAN LUNDBERG & WOESSNER, P.A.

(57) ABSTRACT

An open source library rating is generated for an open source library based on dependencies of the library, vulnerabilities of the library, an age of the library, a popularity of the library, a history of the library, or any suitable combination thereof. The rating of a specific version of a library may be generated based on a base score for all versions of the library and a version score for the specific version of the library. An authorization system receives a request from a developer to add a library to a software application. In response, the authorization system accesses a rating for the library. Based on the rating, the authorization system approves the request, denies the request, or recommends an alternative library.

20 Claims, 7 Drawing Sheets

Related U.S. Application Data continuation of application No. 16/403,803, filed on May 6, 2019, now Pat. No. 11,100,239.

(56) References Cited

U.S. PATENT DOCUMENTS

| | | | |
|---|---|---|---|
| 11,100,239 B2 | 8/2021 | Sun et al. | |
| 11,709,949 B2 | 7/2023 | Sun et al. | |
| 11,749,494 B2 | 9/2023 | Miwa et al. | |
| 2004/0221176 A1 | 11/2004 | Cole | |
| 2014/0165034 A1* | 6/2014 | Balasubramanian | G06F 8/77 717/121 |
| 2019/0079734 A1 | 3/2019 | Kadam et al. | |
| 2019/0205542 A1* | 7/2019 | Kao | G06F 8/10 |
| 2020/0202007 A1* | 6/2020 | Nagaraja | G06F 8/71 |
| 2020/0218533 A1 | 7/2020 | Sharma et al. | |
| 2020/0242254 A1* | 7/2020 | Velur | G06F 21/552 |
| 2020/0356681 A1 | 11/2020 | Sun et al. | |
| 2021/0326462 A1 | 10/2021 | Sun et al. | |
| 2023/0325518 A1 | 10/2023 | Sun et al. | |

OTHER PUBLICATIONS

"U.S. Appl. No. 17/364,112, Non Final Office Action mailed Mar. 3, 2023", 6 pgs.

"U.S. Appl. No. 17/364,112, Notice of Allowance mailed May 12, 2023", 8 pgs.

"U.S. Appl. No. 17/364,112, Response filed Apr. 25, 2023 to Non Final Office Action mailed Mar. 3, 2023", 9 pgs.

"U.S. Appl. No. 18/205,911, Non-Final Office Action mailed Feb. 22, 2024", 7 pgs.

"U.S. Appl. No. 18/205,911, Notice of Allowance mailed Apr. 19, 2024", 7 pgs.

"U.S. Appl. No. 18/205,911, Response filed Apr. 3, 2024 to Non Final Office Action mailed Feb. 22, 2024", 8 pgs.

* cited by examiner

BASE LIBRARY RATING TABLE — 300

| LIBRARY ID | HISTORY SCORE | POPULARITY SCORE |
|---|---|---|
| 1 | 0 | 75 |
| 2 | 75 | 0 |
| 3 | 100 | 100 |

310 — table; 320 — header row; 330A, 330B, 330C — data rows

VERSION LIBRARY RATING TABLE

| LIBRARY ID | VERSION ID | AGE SCORE | VULNERABILITY SCORE | DEPENDENCY SCORE | RATING |
|---|---|---|---|---|---|
| 1 | 1 | 20 | 40 | 80 | 49.5 |
| 1 | 2 | 80 | 25 | 60 | 43.5 |
| 1 | 3 | 60 | 75 | 100 | 73.5 |
| 2 | 1 | 25 | 100 | 100 | 80 |

340 — table; 350 — header row; 360A, 360B, 360C, 360D — data rows

*FIG. 3*

DEPENDENCY TABLE 410

| LIBRARY ID | VERSION ID | INCLUDED LIBRARY ID | INCLUDED VERSION ID |
|---|---|---|---|
| 1 | 1 | 2 | 1 |
| 1 | 2 | 2 | 1 |
| 1 | 2 | 3 | 2 |

EQUIVALENCY TABLE 440

| GROUP ID | LIBRARY ID | VERSION ID |
|---|---|---|
| 1 | 2 | 1 |
| 1 | 2 | 2 |
| 1 | 3 | 1 |
| 1 | 3 | 2 |

*FIG. 4*

OPEN SOURCE LIBRARY SECURITY RATING

CROSS-REFERENCE TO RELATED APPLICATIONS

This application is a continuation of prior U.S. application Ser. No. 18/205,911, filed on Jun. 5, 2023, which is a continuation of prior U.S. application Ser. No. 17/364,112, filed on Jun. 30, 2021, which is a continuation of prior U.S. application Ser. No. 16/403,803, filed on May 6, 2019, which applications are incorporated by reference herein in their entireties.

TECHNICAL FIELD

The subject matter disclosed herein generally relates to open source libraries. Specifically, the present disclosure addresses systems and methods to generate security ratings for open source libraries and to control the creation of applications including libraries based on the security ratings.

BACKGROUND

Software projects often make use of existing open source libraries to reduce development time. However, integrating existing libraries with an application incorporates vulnerabilities of those libraries into the application. Accordingly, when determining whether to incorporate a library, developers want to consider the security of the library in the decision-making process.

A project vulnerability report is generated for a selected library that indicates a security track record for the library and a relative number of reported vulnerabilities for the library. By comparing the project vulnerability reports for several libraries, a developer is able to select a relatively secure library for a software project.

BRIEF DESCRIPTION OF THE DRAWINGS

Some embodiments are illustrated by way of example and not limitation in the figures of the accompanying drawings.

FIGS. 3-4 are block diagrams of a database schema for use in generating and using open source library ratings, according to some example embodiments.

DETAILED DESCRIPTION

Example methods and systems are directed to generating and using open source library ratings. An open source library rating is generated for an open source library based on dependencies of the library, vulnerabilities of the library, an age of the library, a popularity of the library, a history of the library, or any suitable combination thereof. The rating of a specific version of a library may be generated based on a base score for all versions of the library and a version score for the specific version of the library.

An authorization system receives a request from a developer to add a library to a software application. In response, the authorization system accesses a rating for the library. Based on the rating, the authorization system approves the request, denies the request, or recommends an alternative library. If the developer accepts the alternative library, the alternative library is added to the software application.

In prior-art security rating systems, vulnerabilities of libraries upon which the library being rated depends were not considered. As a result, a library could be rated as secure even though use of the library required use of another library known to be vulnerable to attack. Through use of the systems and methods described herein, these secondary vulnerabilities are included in the security score, allowing for better selection of libraries and more secure application development. Further, by integrating the use of the security rating into an authorization server, a device is created that automatically prevents application developers from adding insecure libraries to a software project. Though the systems and methods are described herein as operating on open source libraries, they are not so limited and could be applied to libraries of any origin.

Figure 1:
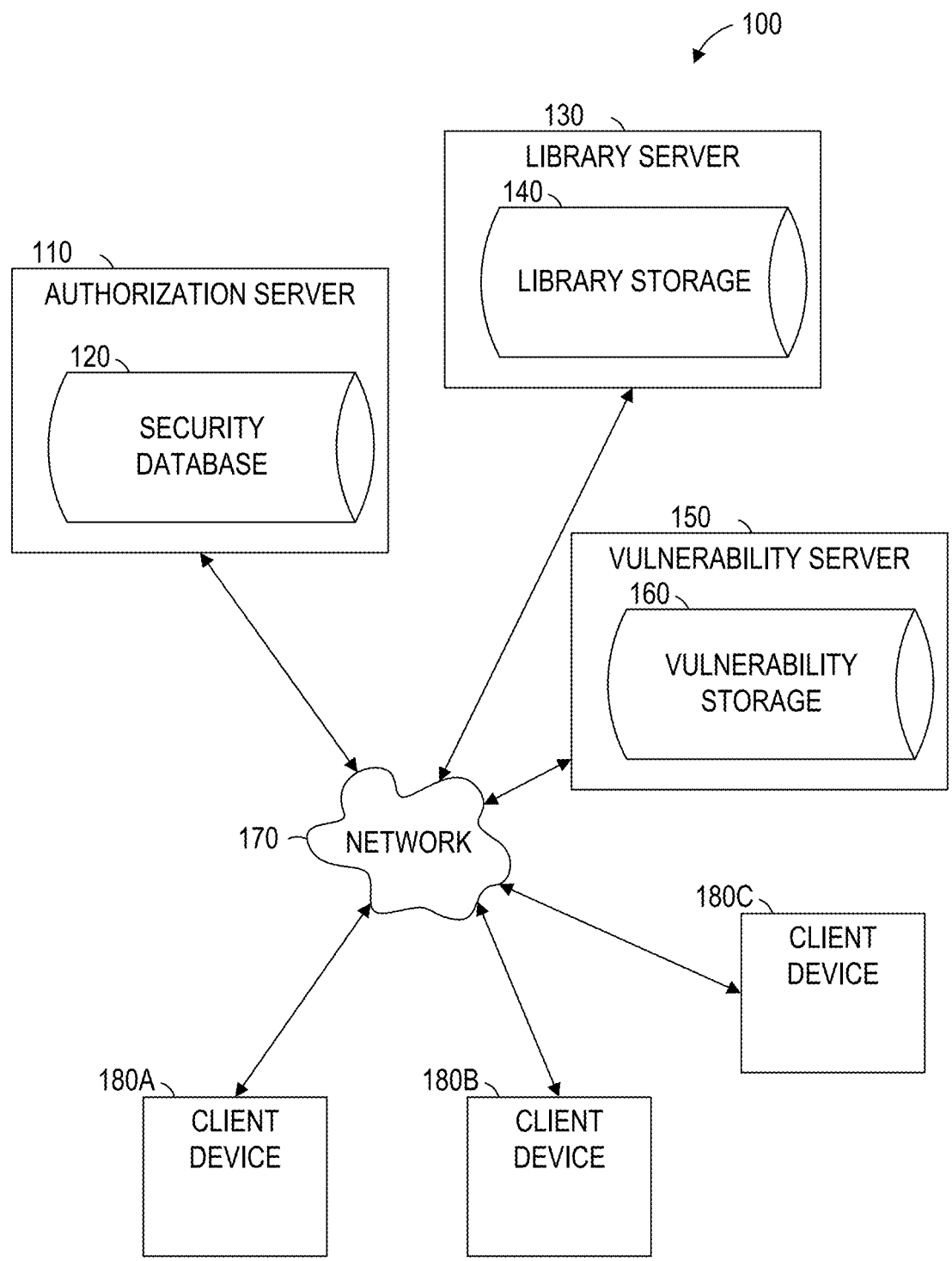
FIG. 1 is a network diagram illustrating a network environment suitable for generating and using open source library ratings, according to some example embodiments.

FIG. 1 is a network diagram illustrating a network environment 100 suitable for generating and using open source library ratings, according to some example embodiments. The network environment 100 includes an authorization server 110, a library server 130, a vulnerability server 150, client devices 180A, 180B, and 180C, and a network 170. The authorization server 110 maintains a security database 120. The library server 130 stores libraries in library storage 140. The vulnerability server 150 stores vulnerability data in vulnerability storage 160.

The authorization server 110, the library server 130, the vulnerability server 150, and the client devices 180A, 180B, and 180C may each be implemented in a computer system, in whole or in part, as described below with respect to FIG. 7. The client devices 180A, 180B, and 180C may be referred to collectively as client devices 180 or generically as a client device 180.

A client device 180 requests authorization from the authorization server 110 to add a library to a software project. Based on a security rating for the library accessed from the security database 120, the authorization server 110 provides the authorization, denies the authorization, or provides an authorization for an alternative library. If a library is authorized, the authorized library is added to the software project.

The authorization server 110 gathers vulnerability data from the vulnerability server 150 via the network 170. The vulnerability storage 160 of the vulnerability server 150 may be an Apache Maven™ database or a national vulnerability database (NVD) provided by the National Institute of Standards and Technology (NIST). Though only one vulnerability server 150 and one vulnerability storage 160 are shown, data described herein as being retrieved from the vulnerability server 150 may be gathered from multiple sources (e.g., both an Apache Maven™ source and an NVD source).

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The authorization server 110, the library server 130, the vulnerability server 150, and the client devices 180A-180C are connected by the network 170. The network 170 may be any network that enables communication between or among machines, databases, and devices. Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof. The security database 120, library storage 140, and vulnerability storage 160 may each be implemented as a solid-state drive (SSD), a hard drive, a network storage device, a redundant array of inexpensive disks (RAID), cloud storage, or any other storage device suitable for storing libraries.

Figure 2:
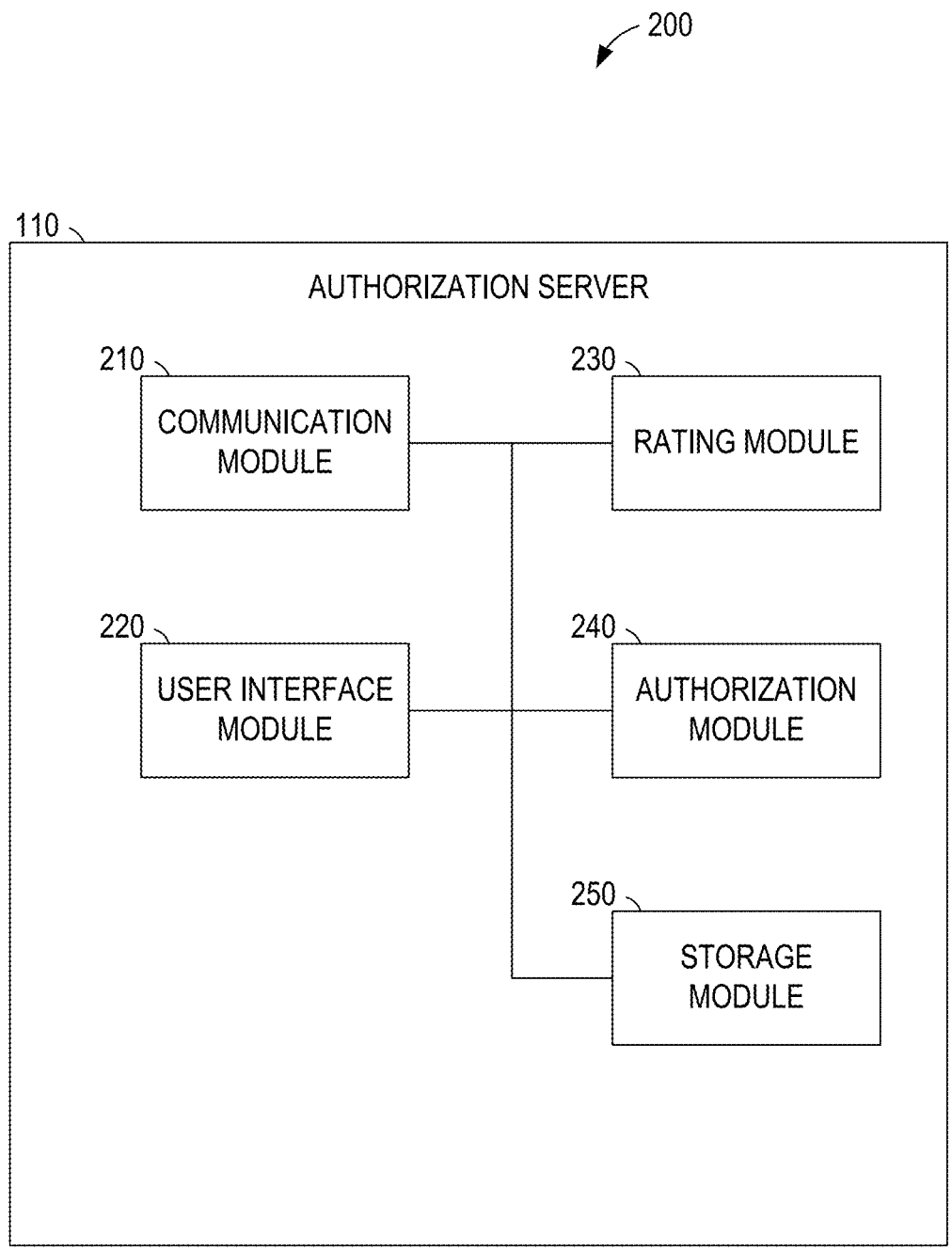
FIG. 2 is a block diagram of an authorization server, according to some example embodiments, suitable for generating and using open source library ratings.

FIG. 2 is a block diagram 200 of the authorization server 110, according to some example embodiments, suitable for generating and using open source library ratings. The authorization server 110 is shown as including a communication module 210, a user interface module 220, a rating module 230, an authorization module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the authorization server 110 and transmits data from the authorization server 110. For example, the communication module 210 may receive, from the client device 180A, a request to add an open source library to a software application. The communication module 210 provides the request to the authorization module 240. The authorization module 240 accesses an existing rating via the storage module 250 or uses the rating module 230 to generate a rating for the open source library. Based on the rating, the authorization module 240 provides or denies the requested authorization to the client device 180A via the communication module 210. Communications sent and received by the communication module 210 may be intermediated by the network 170.

The user interface module 220 causes presentation of a user interface for the authorization server 110 on a display associated with the client device 180A, 180B, or 180C. The user interface allows a user to select an open source library to add to a software application.

The rating module 230 generates ratings for open source libraries using data gathered from the library server 130. The methods and data structures described herein are used by the rating module 230 to generate open source library security ratings.

FIGS. 3-4 are block diagrams of a database schema 300 for use in generating and using open source library ratings, according to some example embodiments. The database schema 300 includes a base library rating table 310, a version library rating table 340, a dependency table 410, and an equivalency table 440. The base library rating table 310 includes rows 330A, 330B, and 330C of a format 320. The version library rating table 340 includes rows 360A, 360B, 360C, and 360D of a format 350. The dependency table 410 includes rows 430A, 430B, and 430C of a format 420. The equivalency table 440 includes rows 460A, 460B, 460C, and 460D of a format 450.

Each of the rows 330A-330C of the base library rating table 310 includes a library identifier, a history score, and a popularity score. The library identifier is a unique identifier for the library of the row. In some example embodiments, a numeric identifier is used, as shown in FIG. 3. In other example embodiments, a string identifier is used. Example string identifiers include package names following the Java naming convention beginning with a reversed domain name of the producer of the library and ending with a unique name within the producer (e.g., com.sap.mylibrary), and uniform resource locators (URLs) (e.g., http://www.sap.com/mylibrary).

The history score is a score generated based on known vulnerabilities for the library and how long those vulnerabilities remain unsolved. In some example embodiments, the rating module 230 requests from the library server 130 a list of common vulnerabilities and exposures (CVE) identifiers for the library (e.g., by providing a unique identifier of the library to the library server 130). The library server 130 responds with the requested list, which is received by the authorization server 110. For each CVE identifier, the rating module 230 accesses a publication time of the CVE, a common vulnerability scoring system (CVSS) score of the CVE, and a release time of the first version of the library affected by the CVE. Based on some or all of the accessed data, the rating module 230 generates a CVE score for each CVE and totals the CVE scores for all of the CVEs identified in the list. The history score is generated based on the totaled CVE scores. In some example embodiments, the equations below are used, with the history score being limited to the range [0, 100] and the sum being taken over the CVEs that affect the library.

$k=0.02$ $t=\text{presentTime}-\text{firstVulnerableReleaseTime(month)}$ $\text{livingTime}=\text{CVEPublishedTime}-\text{firstVulnerableReleaseTime(month)}$ $AW=e^{-kt}$ $\text{CVEScore}=\text{CVSS}*\lg\text{livingTime}*AW$ $$\text{historyScore}=100-\sum \text{CVEScore}$$

In some example embodiments, the CVE information is not accessed from the server that provides the libraries (e.g., the library server 130), but from a different server, such as the NVD or the Apache Maven™ server. A local copy of the CVE data may be obtained ahead of time by the authorization server 110 and duplicated in the security database 120 for faster access.

The number of libraries that depend on the rated library is used to determine the popularity score. The rating module 230 requests a list of libraries that depend on the rated library from the library server 130 or another central repository. Depending on the number of libraries that depend on the rated library, the rating module 230 generates the popularity score. In some example embodiments, the equations below are used, with the popularity score being limited to the range [0, 100].

$$\text{base} = 4$$
$$\text{popularityScore} = \frac{\text{dependencyNumber}}{\text{base}}$$

The history score and popularity score apply to all versions of a library. The age score, vulnerability score, dependency score, and rating are version-specific. Thus, each row of the version library rating table 340 identifies the library and version for the row as well as the age score, the vulnerability score, the dependency score, and the rating for the version of the library.

The age score is based on the age of the version. The rating module 230 requests, using the library identifier and the version identifier, a release date for the version of the library. In some example embodiments, the request includes the library identifier, and the response includes release dates for multiple (e.g., all) versions of the library. Based on the release date of the version, the rating module 230 generates the age score and stores the age score in the version library rating table 340. In some example embodiments, the equation below is used, and the age score is limited to the range [0, 100]. In the example below, presentTime and releaseTime are measured in years, but have fractional precision.

$$\text{ageScore} = 100 - 10 * (\text{presentTime} - \text{releaseTime})$$

A library release version's vulnerability score reflects the security situation of that release in terms of security issues affecting that version. The higher a library release version's vulnerability score is, the safer that release is to use. As in generating the history score, the rating module 230 requests a list of all CVEs affecting a library. For each CVE, the CVSS score and a list of versions affected by the CVE are accessed. Based on the CVEs affecting each version and the CVSS scores for those CVEs, a vulnerability score is generated for each release version. In some example embodiments, the equations below are used, with the vulnerability score being limited to the range [0, 100], and the sum is taken over the CVEs that affect the library release version.

$$\text{weightedCVSS} = \begin{cases} CVSS, & CVSS < 7 \\ 2*CVSS, & 7 \le CVSS < 9 \\ 4*CVSS, & CVSS \ge 9 \end{cases}$$
$$\text{vulnerabilityScore} = 100 - \sum \text{weightedCVSS}$$

The dependency score is based on the security ratings of libraries that the rated library version depends on. The rating module 230 requests a list of library and version identifiers of libraries that the rated library version depends on. The rating field of the version library rating table 340 for each identified library version is accessed, or, if the data is not present, a rating for the library version is generated by the rating module 230 before proceeding. Based on the accessed ratings, the rating module 230 generates a dependency score for the version of the library. The equation below is an example for determining the dependency score, wherein the dependency score is limited to the range [0, 100] and the sum is taken over the libraries that the rated library version depends on.

$$\text{dependencyScore} = 100 - \sum 100 - \text{securityRatingOfDependentLibrary}$$

The rating for the library version is based on one or more of the scores stored in the base library rating table 310 and the version library rating table 340. In some example embodiments, a plurality of scores are combined using a weighted formula. The equation below is an example for determining the rating. If each of the component scores uses the same range (e.g., [0, 100]), the resulting rating will be in the same range.

$$\text{securityRating} = \\ 0.1 \times \text{historyScore} + 0.1 \times \text{ageScore} + 0.4 \times \text{vulnerabilityScore} \\ + 0.1 \times \text{popularityScore} + 0.3 \times \text{dependencyScore}$$

The dependency table 410 stores dependency relationships between libraries. Each of the rows 430A-430C contains a library identifier and a version identifier of a library that depends on another library as well as the library identifier and version identifier of the other library. Thus, by reference to the dependency table 410 and the version library rating table 340, the rating module 230 determines the dependency score for a library version. In this example, version 1 of library 1 depends on version 1 of library 2, as indicated in the row 430A. Further, version 1 of library 2 has a rating of 80. As a result, using the example equation previously described for computing the dependency score, the dependency score of version 1 of library 1 is 80, as shown in the row 360A of the version library rating table 340.

In some example embodiments, the generating of a rating for a software library comprises generating a base score for the software library and a version score for the software library version. For example, both the history score and the popularity score are base scores for the software library, since those two scores are not version-specific; the age score, vulnerability score, and dependency score are version scores, since these scores are determined on a version-by-version basis rather than having a single value shared by all versions of the library.

Each of the rows 460A-460D in the equivalency table 440 identifies a group for a specific library and version. Versions having the same group provide similar functionality and may be recommended as substitutes for each other. Thus, in the example of FIG. 4, versions 1 and 2 of library 2 provide similar functionality to each other and to versions 1 and 2 of library 3.

Figure 5:
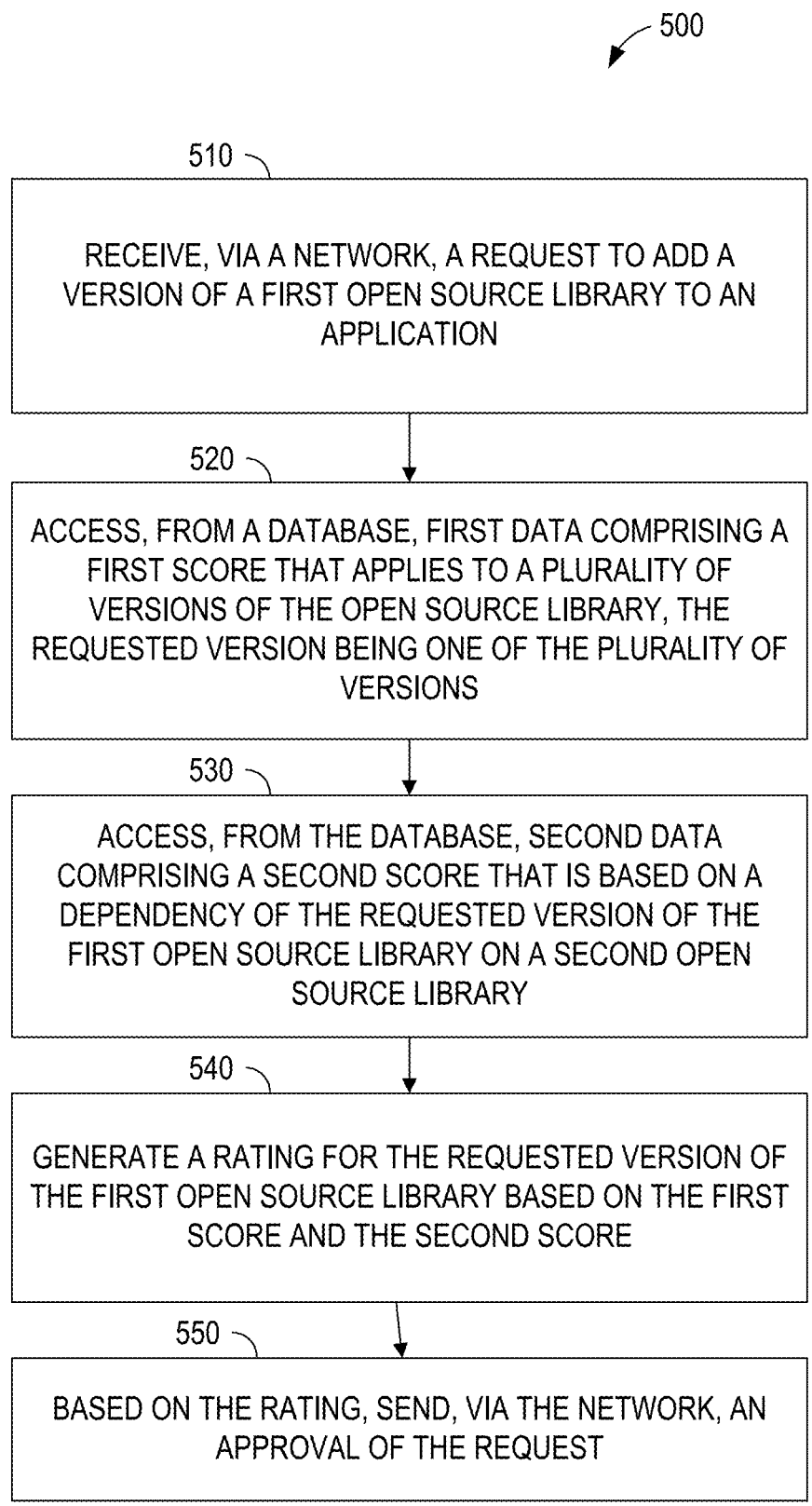
FIG. 5 is a flowchart illustrating operations of a method suitable for generating and using open source library ratings, according to some example embodiments.

FIG. 5 is a flowchart illustrating operations of a method 500 suitable for generating and using open source library ratings, according to some example embodiments. The method 500 includes operations 510, 520, 530, 540, and 550. By way of example and not limitation, the method 500 is described as being performed by the systems and databases of FIGS. 1-2 using the database schema of FIGS. 3-4.

In operation 510, the authorization module 240 receives a request via the network 170 to add a version of a first open source library to an application. As an example, the client device 180A sends a request to the authorization server 110 via the network 170 in response to receiving a command via a graphical user interface presented to a user.

The rating module 230, in operation 520, accesses first data from a database, the first data comprising a first score that applies to a plurality of versions of the open source library, the requested version being one of the plurality of versions. In this example and with reference to the database schema 300, the request is for version 3 of library 1. The history score and the popularity score of the row 330A apply to all versions of library 1, including version 3. Thus, the rating module 230 accesses the history score, the popularity score, or both in operation 520.

The rating module 230 accesses second data from the database, the second data comprising a second score that is based on a dependency of the requested version of the first open source library on a second open source library (operation 530). In this example, the row 360C applies only to version 3 of library 1 and the dependency score is based on the dependencies of the requested version of the first open source library on other open source libraries.

In operation 540, the rating module 230 generates a rating for the requested software library based on the first score and the second score. For example, the equations discussed with regards to FIGS. 3-4 may be used to determine a rating for the requested software library based on the history score and popularity scores of the row 330A and the age score, vulnerability score, and dependency score of the row 360C.

Based on the rating, the authorization module 240 approves the request and sends, via the communication module 210, the approval of the request. As an example, the authorization module 240 retrieves the rating for the requested version of the first open source library from the version library rating table 340 via the storage module 250. The rating is compared to a predetermined threshold (e.g., a predetermined rating of 75) and, based on a result of the comparison (e.g., the rating for the requested version of the first open source library being equal to or greater than the predetermined threshold), the authorization module 240 approves or denies the request.

In some example embodiments, the authorization module 240 suggests an alternative library, provides authorization to add the alternative library to the software project, or both. As an example, the authorization module 240 identifies one or more alternative libraries using the equivalency table 440. In the example database schema of FIG. 4, versions 1 and 2 of library 2 are in the same group as versions 1 and 2 of library 3. Accordingly, when a requested one of the four identified library versions cannot be authorized, a version of a library that meets or exceeds the threshold (with reference to the version library rating table 340) is recommended as an alternative. In some example embodiments, when multiple libraries and versions meet or exceed the threshold, the library version with the highest rating is recommended, authorized, or both.

Thus, by use of the method 500, insecure libraries are prevented from being added to a software project, and only secure libraries are added. As a result, the software project is less likely to encounter security vulnerabilities, and the resulting piece of software is more secure. The improved security of the software is an improvement to the functioning of the computer itself (e.g., by improving uptime, avoiding the loss of data, or both) and saves efforts that would otherwise be expended in detecting and repairing vulnerabilities.

Figure 6:
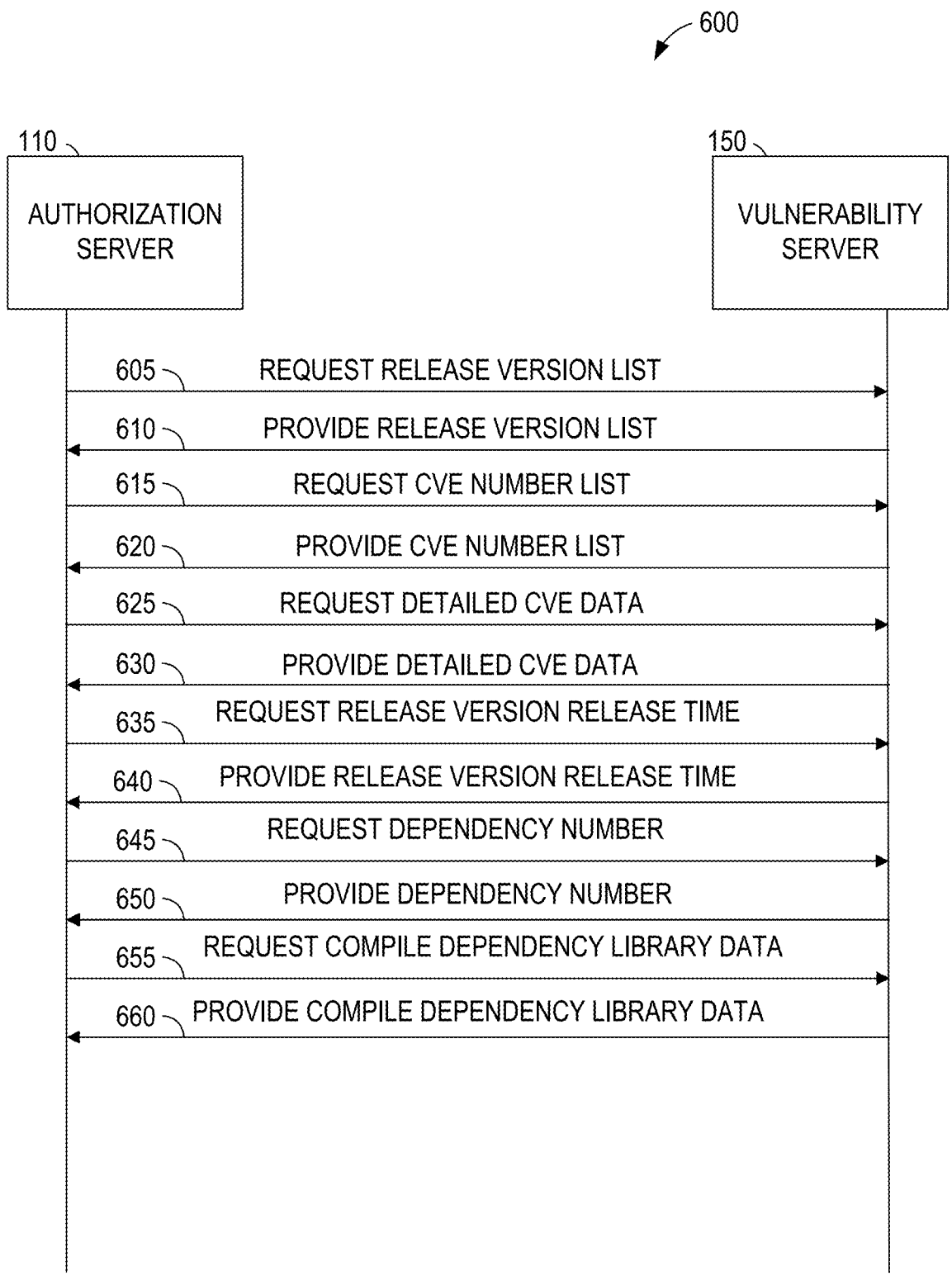
FIG. 6 is a communication diagram illustrating communications between an authorization server and a vulnerability server in generating and using open source library ratings, according to some example embodiments.

FIG. 6 is a communication diagram 600 illustrating communications between the authorization server 110 and the vulnerability server 150 in generating and using open source library ratings, according to some example embodiments. The communication diagram 600 includes communications 605, 610, 615, 620, 625, 630, 635, 640, 645, 650, 655, and 660, performed via the network 170.

In communication 605, the authorization server 110 requests a release version list for an open source library from the vulnerability server 150. The vulnerability server 150 responds, in communication 610, with the requested release version list. The open source library may have a unique identifier (e.g., a unique group identifier/artifact identifier pair) that is included in the request, the response, or both.

The authorization server 110, in communication 615, requests a CVE number list for an open source library or a version of an open source library. The vulnerability server 150 responds with the requested CVE number list (communication 620). The CVE number list includes a list of all CVE identifiers for CVEs associated with the queried library or version. The request includes the unique identifier for the open source library and, optionally, an identifier of the version.

Detailed CVE data is requested by the authorization server 110 (communication 625) for the open source library. In response, the vulnerability server 150 provides, in communication 630, the requested detailed CVE data. The detailed CVE data includes a CVSS score for the CVE, a list of versions of the open source library affected by the CVE, a release time of the CVE, or any suitable combination thereof. The received CVE data is used to determine a vulnerability score which is stored in the security database 120 (e.g., the vulnerability score of the version library rating table 340).

In communication 635, the authorization server 110 requests the release time for a release version of the open source library. In some example embodiments, this is accomplished by requesting all release times for all versions of the open source library. The vulnerability server 150 responds with the requested release time in communication 640. The received release time is used to determine an age score for storage in the security database 120 (e.g., the age score of the version library rating table 340).

The authorization server 110, in communication 645, requests the dependency number for the open source library. In communication 650, the vulnerability server 150 responds with the requested dependency number. The dependency number is used to determine a popularity score that is stored in the security database 120 (e.g., the popularity score of the base library rating table 310).

Dependency library data is requested by the authorization server 110 (communication 655) for a version of the open source library. The request includes the library's unique identifier and the release version number. The vulnerability server 150, in communication 660, responds with the dependency library data. The dependency library data identifies the unique identifier and version number of each library that the version of the open source library depends on. Using the retrieved library and version identifiers, the authorization server 110 determines if a security rating for the dependencies has already been generated. If so, the dependency information is used to determine the dependency score of the version library rating table 340. If any dependencies have not yet been rated, the process of generating a rating for the version of the open source library is delayed while a rating for each dependency is generated. After the ratings for the dependencies are generated, the dependency score for the version of the open source library is determined and stored.

Thus, by use of the communications 605-655, the authorization server 110 retrieves the data used for generating a rating of a version of an open source library. Once the data is stored in the security database 120, the authorization server 110 may access the data without repeating the process of requesting data over a network, allowing for faster access time.

EXAMPLES

Example 1. A method comprising:
receiving, via a network, a request to add a version of a first open source library to an application;
accessing a database to obtain first data comprising a first score that applies to all of a plurality of versions of the first open source library, the requested version being one of the plurality of versions;
accessing the database to obtain second data comprising a second score that is based on a dependency of the requested version of the first open source library on a second open source library;
generating, by one or more processors, a rating for the requested version of the first open source library based on the first score and the second score; and
based on the rating, communicating, via the network, an approval of the request.

Example 2. The method of example 1, further comprising:
accessing the database to obtain third data comprising a third score that based on known vulnerabilities of the requested version of the first open source library; and wherein
the generating of the rating is further based on the third score.

Example 3. The method of example 2, further comprising:
requesting, via the network, fourth data representing a published time and severity of each of the known vulnerabilities of the requested version of the first open source library;
receiving, in response to the request, the fourth data;
determining, based on the published time of each of the known vulnerabilities of the requested version of the first open source library and a release time of the requested version of the first open source library, a duration of time for each of the known vulnerabilities of the requested version of the first open source library;
generating the third score based on the durations of time for the known vulnerabilities of the requested version of the first open source library; and
storing the third score in the database.

Example 4. The method of example 3, wherein:
the generating of the third score comprises applying weights to the severities of the known vulnerabilities of the requested version of the first open source library, such that vulnerabilities with shorter durations affect the third score more than vulnerabilities with longer durations.

Example 5. The method of example 3 or example 4, wherein:
the generating of the third score comprises applying weights to the severities of the known vulnerabilities of the requested version of the first open source library, such that vulnerabilities with higher severities affect the third score more than vulnerabilities with lower severities.

Example 6. The method of examples 1-5, wherein:
the generating of the rating for the first open source library is further based on a number of libraries that depend on the first open source library.

Example 7. The method of example 6, wherein:
a lower number of libraries that depend on the requested version of the first open source library has a greater effect on the rating than a higher number of libraries that depend on the requested version of the first open source library.

Example 8. The method of examples 1-7, wherein:
the generating of the rating for the requested version of the first open source library is further based on an age of the requested version of the first open source library.

Example 9. The method of example 8, wherein:
a greater age has a greater effect on the rating than a lesser age.

Example 10. A system comprising:
a memory that stores instructions; and
one or more processors configured by the instructions to perform operations comprising:
receiving, via a network, a request to add a version of a first open source library to an application;
accessing a database to obtain first data comprising a first score that applies to all of a plurality of versions of the first open source library, the requested version being one of the plurality of versions;
accessing the database to obtain second data comprising a second score that is based on a dependency of the requested version of the first open source library on a second open source library;
generating a rating for the requested version of the first open source library based on the first score and the second score; and
based on the rating, communicating, via the network, an approval of the request.

Example 11. The system of example 10, wherein the operations further comprise:
accessing the database to obtain third data comprising a third score that based on known vulnerabilities of the requested version of the first open source library; and wherein
the generating of the rating is further based on the third score.

Example 12. The system of example 11, wherein the operations further comprise:
requesting, via the network, fourth data representing a published time and severity of each of the known vulnerabilities of the requested version of the first open source library;
receiving, in response to the request, the fourth data;
determining, based on the published time of each of the known vulnerabilities of the requested version of the first open source library and a release time of the requested version of the first open source library, a duration of time for each of the known vulnerabilities of the requested version of the first open source library;
generating the third score based on the durations of time for the known vulnerabilities of the requested version of the first open source library; and
storing the third score in the database.

Example 13. The system of example 12, wherein:
the generating of the third score comprises applying weights to the severities of the known vulnerabilities of the requested version of the first open source library, such that vulnerabilities with shorter durations affect the third score more than vulnerabilities with longer durations.

Example 14. The system of example 12 or example 13, wherein:
the generating of the third score comprises applying weights to the severities of the known vulnerabilities of the requested version of the first open source library, such that vulnerabilities with higher severities affect the third score more than vulnerabilities with lower severities.

Example 15. The system of any of examples 10-14, wherein:
the generating of the rating for the first open source library is further based on a number of libraries that depend on the first open source library.

Example 16. The system of example 15, wherein:
a lower number of libraries that depend on the requested version of the first open source library has a greater effect on the rating than a higher number of libraries that depend on the requested version of the first open source library.

Example 17. The system of any of examples 10-16, wherein:
the generating of the rating for the requested version of the first open source library is further based on an age of the requested version of the first open source library.

Example 18. The system of example 17, wherein:
a greater age has a greater effect on the rating than a lesser age.

Example 19. A non-transitory computer-readable medium that stores instructions that, when executed by one or more processors, cause the one or more processors to perform operations comprising:
receiving, via a network, a request to add a version of a first open source library to an application;
accessing a database to obtain first data comprising a first score that applies to all of a plurality of versions of the first open source library, the requested version being one of the plurality of versions;
accessing the database to obtain second data comprising a second score that is based on a dependency of the requested version of the first open source library on a second open source library;
generating a rating for the requested version of the first open source library based on the first score and the second score; and
based on the rating, communicating, via the network, an approval of the request.

Example 20. The non-transitory computer-readable medium of claim 19, wherein the operations further comprise:
accessing the database to obtain third data comprising a third score that based on known vulnerabilities of the requested version of the first open source library; and
wherein
the generating of the rating is further based on the third score.

Figure 7:
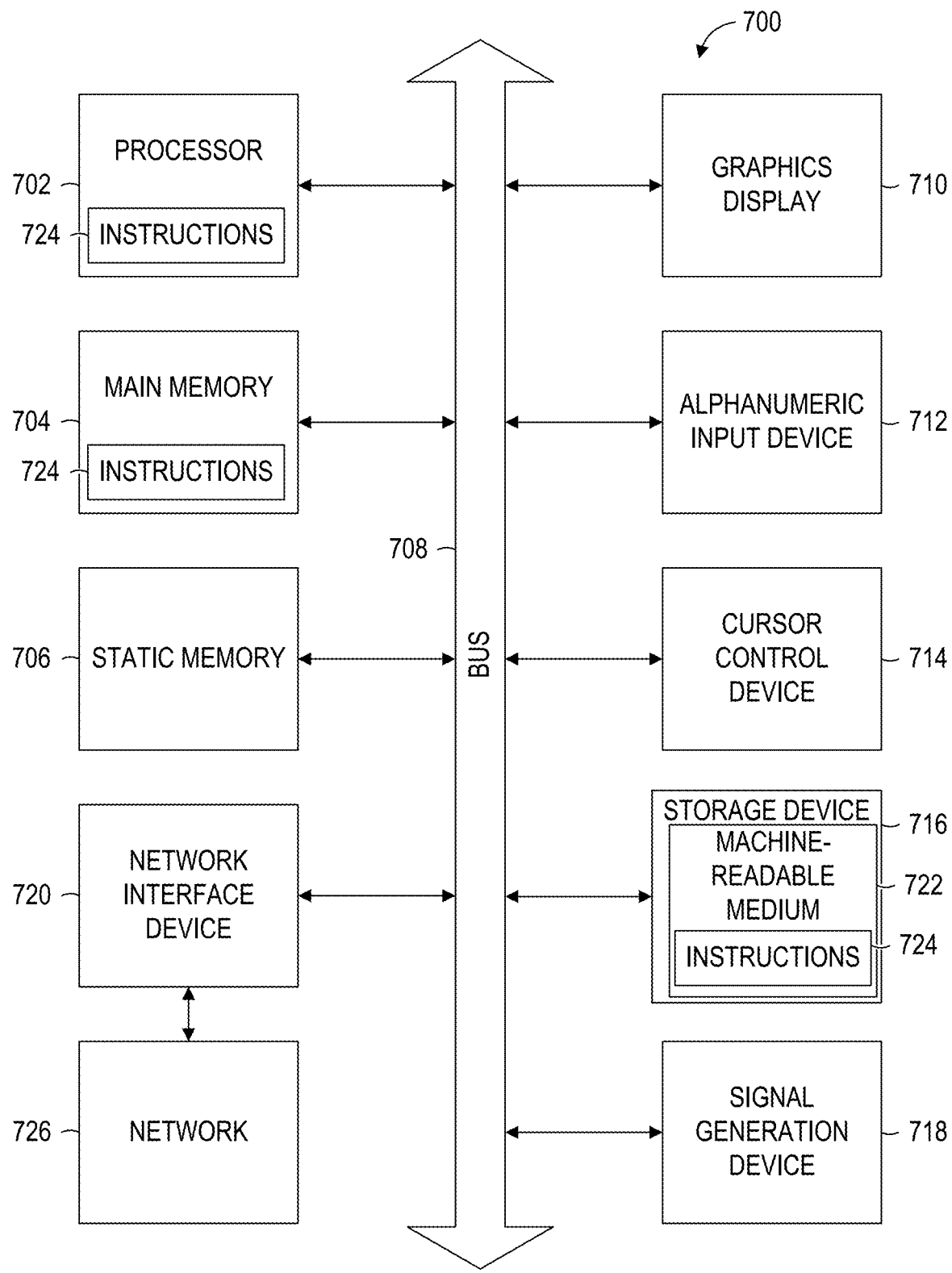
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light-emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or another pointing instrument), a storage device 716, a signal generation device 718 (e.g., a speaker), and a network interface device 720.

The storage device 716 includes a machine-readable medium 722 on which are stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 700), such that the instructions, when executed by one or more processors of the machine (e.g., the processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
    a memory that stores instructions; and
    one or more processors configured by the instructions to perform operations comprising:
        receiving, via a network, a request for a version of a first library;
        accessing a database to obtain first data comprising a first score that applies to all of a plurality of versions of the first library, the requested version being one of the plurality of versions;
        accessing second data comprising a second score that is based on a dependency of the requested version of the first library on a second library;
        generating a rating for the requested version of the first library based on the first score and the second score; and
        based on the rating, communicating, via the network, an approval of the request.

2. The system of claim 1, wherein the operations further comprise:
    requesting, via the network, fourth data representing a published time and severity of each known vulnerability of the requested version of the first library;
    receiving, in response to the request, the fourth data;
    determining, based on the published time of each known vulnerability of the requested version of the first library and a release time of the requested version of the first library, a duration of time for each known vulnerability of the requested version of the first library;
    generating the second score based on the durations of time for the known vulnerabilities of the requested version of the first library; and
    storing the second score in the database.

3. The system of claim 2, wherein:
    the generating of the second score comprises applying weights to the severity of each known vulnerability of the requested version of the first library, such that vulnerabilities with shorter durations affect the second score more than vulnerabilities with longer durations.

4. The system of claim 2, wherein:
    the generating of the second score comprises applying weights to the severity of each known vulnerability of the requested version of the first library, such that vulnerabilities with higher severities affect the second score more than vulnerabilities with lower severities.

5. The system of claim 2, wherein the first score is further based on a popularity of the first library.

6. The system of claim 5, wherein a lower number of libraries that depend on the requested version of the first library has a greater effect on the rating than a higher number of libraries that depend on the requested version of the first library.

7. A non-transitory computer-readable medium that stores instructions that, when executed by one or more processors, cause the one or more processors to perform operations comprising:
    receiving, via a network, a request for a version of a first library;
    accessing a database to obtain first data comprising a first score that applies to all of a plurality of versions of the first library, the requested version being one of the plurality of versions;
    accessing second data comprising a second score that is based on a dependency of the requested version of the first library on a second library;
    generating a rating for the requested version of the first library based on the first score and the second score; and
    based on the rating, communicating, via the network, an approval of the request.

8. The non-transitory computer-readable medium of claim 7, wherein the operations further comprise:
    requesting, via the network, fourth data representing a published time and severity of each known vulnerability of the requested version of the first library;
    receiving, in response to the request, the fourth data;
    determining, based on the published time of each known vulnerability of the requested version of the first library and a release time of the requested version of the first library, a duration of time for each known vulnerability of the requested version of the first library;
    generating the second score based on the durations of time for the known vulnerabilities of the requested version of the first library; and
    storing the second score in the database.

9. The non-transitory computer-readable medium of claim 8, wherein:
    the generating of the second score comprises applying weights to the severity of each known vulnerability of the requested version of the first library, such that vulnerabilities with shorter durations affect the second score more than vulnerabilities with longer durations.

10. The non-transitory computer-readable medium of claim 8, wherein:
    the generating of the second score comprises applying weights to the severity of each known vulnerability of the requested version of the first library, such that vulnerabilities with higher severities affect the second score more than vulnerabilities with lower severities.

11. The non-transitory computer-readable medium of claim 7, wherein the first score is further based on a popularity of the first library.

12. The non-transitory computer-readable medium of claim 11, wherein a lower number of libraries that depend on the requested version of the first library has a greater effect on the rating than a higher number of libraries that depend on the requested version of the first library.

13. A method comprising:
   receiving, via a network, a request for a version of a first library;
   accessing a database to obtain first data comprising a first score that applies to all of a plurality of versions of the first library, the requested version being one of the plurality of versions;
   accessing second data comprising a second score that is based on a dependency of the requested version of the first library on a second library;
   generating, by one or more processors, a rating for the requested version of the first library based on the first score and the second score; and
   based on the rating, communicating, via the network, an approval of the request.

14. The method of claim 13, further comprising:
   requesting, via the network, fourth data representing a published time and severity of each known vulnerability of the requested version of the first library;
   receiving, in response to the request, the fourth data;
   determining, based on the published time of each known vulnerability of the requested version of the first library and a release time of the requested version of the first library, a duration of time for each known vulnerability of the requested version of the first library;
   generating the second score based on the durations of time for the known vulnerabilities of the requested version of the first library; and
   storing the second score in the database.

15. The method of claim 14, wherein:
   the generating of the second score comprises applying weights to the severity of each known vulnerability of the requested version of the first library, such that vulnerabilities with shorter durations affect the second score more than vulnerabilities with longer durations.

16. The method of claim 14, wherein:
   the generating of the second score comprises applying weights to the severity of each known vulnerability of the requested version of the first library, such that vulnerabilities with higher severities affect the second score more than vulnerabilities with lower severities.

17. The method of claim 13, wherein the first score is further based on a popularity of the first library.

18. The method of claim 17, wherein a lower number of libraries that depend on the requested version of the first library has a greater effect on the rating than a higher number of libraries that depend on the requested version of the first library.

19. The method of claim 13, wherein the generating of the rating for the requested version of the first library is further based on an age of the requested version of the first library.

20. The method of claim 19, wherein a greater age has a greater effect on the rating than a lesser age.

* * * * *